United States Patent [19]
Badejo et al.

[11] Patent Number: 6,066,203
[45] Date of Patent: May 23, 2000

[54] PIGMENT DERIVATIVES FOR WATERBORNE COATINGS

[75] Inventors: Ibraheem T. Badejo; Daphne J. Rice, both of Charleston, S.C.

[73] Assignee: Bayer Corporation, Pittsburgh, Pa.

[21] Appl. No.: 09/070,970

[22] Filed: May 1, 1998

[51] Int. Cl.$^7$ .......................... C09B 48/00; C09B 67/00; C09B 67/20
[52] U.S. Cl. .......................... 106/497; 106/493; 106/494; 106/495; 106/496; 106/498; 549/49
[58] Field of Search ....................... 106/493, 494, 106/495, 496, 497, 498; 546/49

[56] References Cited

U.S. PATENT DOCUMENTS

| | | | |
|---|---|---|---|
| 3,418,322 | 12/1968 | Tulagin et al. | 260/279 |
| 3,446,641 | 5/1969 | Mitchell et al. | 106/288 |
| 4,088,507 | 5/1978 | Tanaka et al. | 106/288 Q |
| 4,172,202 | 10/1979 | Papenfuhs | 546/100 |
| 4,310,359 | 1/1982 | Ehashi et al. | 106/288 Q |
| 4,317,682 | 3/1982 | Katsura et al. | 106/493 |
| 5,071,482 | 12/1991 | Dietz et al. | 106/498 |
| 5,137,576 | 8/1992 | Macholdt et al. | 106/495 |
| 5,368,641 | 11/1994 | Dietz et al. | 106/495 |

FOREIGN PATENT DOCUMENTS

| | | |
|---|---|---|
| 0 848 043 | 6/1998 | European Pat. Off. . |
| 2009205 | 6/1979 | United Kingdom . |
| 1544839 | 4/1998 | United Kingdom . |

*Primary Examiner*—Anthony Green
*Attorney, Agent, or Firm*—Joseph C. Gil; Richard E. L. Henderson

[57] ABSTRACT

This invention relates to pigment derivatives having the formula

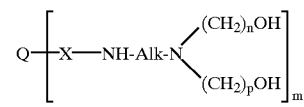

wherein
Q represents an organic pigment moiety;
X is $-SO_2-$ or $-CO-$;
Alk is $C_2–C_8$ alkylene or substituted $C_2–C_8$ alkylene;
m is an integer of from 1 to 4;
n and p are independently integers of from 2 to 6.

This invention further relates to the treatment of organic pigments with such pigment derivatives and the use of such treated pigments in coating compositions.

11 Claims, No Drawings

PIGMENT DERIVATIVES FOR WATERBORNE COATINGS

BACKGROUND OF THE INVENTION

This invention relates to di(hydroxyalkyl)aminoalkylsulfonamide and di(hydroxyalkyl)aminoalkylcarboxamide pigment derivatives that can be used to improve the performance of pigments used in coating systems.

The synthetic steps used in the manufacture of known organic pigments is generally straighfforward. Typically, however, the initially formed crude compounds are unsuitable for use as pigments and must undergo one or more additional finishing steps to modify the particle size, particle shape, or crystal structure to achieve suitable pigmentary quality, rheological properties, and dispersibility.

Such improvements can often be achieved by treating the organic pigments with various additives, including various sulfonic acid and carboxylic acid derivatives of organic pigments. E.g., U.S. Pat. Nos. 3,418,322, 3,446,641, 4,088,507, 4,310,359, and 5,368,641 and British Patents 1,544,839 and 2,009,205.

Among the organic pigment derivatives that can be used to improve pigment performance are dialkylaminoalkylsulfonamide and dialkylaminoalkylcarboxamide derivatives. For example, U.S. Pat. No. 5,368,641 discloses quinacridone pigment derivatives having the formula

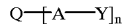

in which Q is a quinacridone radical; A can be, inter alia, sulfonamide or carboxamide groups connected through alkylene groups to the Y group; Y is $-NR^4R^5$ (in which $R^4$ and $R^5$ are hydrogen or $C_1-C_{22}$ alkyl or alkylene) or a five- to seven-membered heterocyclic group (which can optionally be substituted); and n is 1 to 4. This patent, however, does not disclose pigment derivatives in which $R^4$ and $R^5$ are substituted alkyl groups and does not disclose the use of the disclosed compounds for waterborne systems.

U.S. Pat. No. 4,310,359 discloses pigment derivatives having the formula

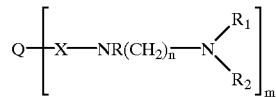

in which Q is the residue of a pigment other than a phthalocyanine; X is $-SO_2-$ or $-CO-$; R is hydrogen, alkyl, or alkenyl; $R_1$ and $R_2$ are independently hydrogen or optionally substituted alkyl or alkenyl or $R_1$ and $R_2$ taken together form a heterocyclic ring; m is 1 to 4; and n is 1 to 6. This patent, however, does not describe specific substituted alkyl groups and does not disclose the use of the disclosed compounds in waterborne pigment systems.

It has now been found that organic pigments treated with di(hydroxyalkyl)aminoalkyl-containing pigment derivatives according to the invention are not only suitable for use in waterborne coating systems but also exhibit improved coloristic and rheological properties compared to organic pigments treated with dialkylaminoalkyl-containing pigment derivatives.

SUMMARY OF THE INVENTION

This invention relates to di(hydroxyalkyl)aminoalkylsulfonamide and di(hydroxyalkyl)aminoalkylcarboxamide pigment derivatives having the formula (I)

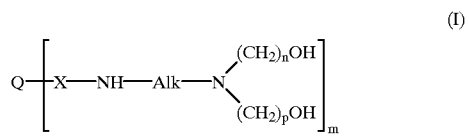

wherein

Q represents an organic pigment moiety;

X is $-SO_2-$ or $-CO-$;

Alk is $C_2-C_8$ alkylene or substituted $C_2-C_8$ alkylene (preferably $C_2-C_4$ alkylene);

m is an integer of from 1 to 4 (preferably 1 or 2);

n and p are independently integers of from 2 to 6 (preferably 2 or 3).

This invention further relates to the treatment of organic pigments with such pigment derivatives to obtain pigment compositions that can be used to impart color to coating systems, particularly waterborne coating systems.

DETAILED DESCRIPTION OF THE INVENTION

Pigment moiety Q can be derived from essentially any class of organic pigments, including quinacridones, phthalocyanines, perylenes (particularly the imides, diimides, anhydrides, and/or dianhydrides of perylene-3,4,9,10-tetracarboxylic acid), dioxazines (that is, triphenedioxazines), 1,4-diketopyrrolopyrroles, anthrapyrimidines, anthanthrones, flavanthrones, indanthrones, isoindolines, isoindolinones, perinones, pyranthrones, thioindigos, 4,4'-diamino-1,1'-dianthraquinonyl, or azo compounds, as well as substituted derivatives thereof. Suitable derivatives include those having one or more substituents that are typical of such pigments, such as $C_1-C_6$ alkyl, $C_1-C_6$ alkoxy, $C_5-C_7$ cycloalkyl, $C_5-C_7$ cycloalkoxy, $C_6-C_{10}$ aryl, $C_6-C_{10}$ aryloxy, $C_7-C_{16}$ aralkyl, $C_7-C_{16}$ aralkoxy, hydroxy, halogen, nitrile, carboxyl or amides thereof (other than those of the present invention), sulfonyl groups (such as alkyl- and arylsulfonyl or sulfoxyl and amides thereof (other than those of the present invention)), or combinations thereof. Substituted derivatives of pigment moiety Q can, of course, include those in which ring nitrogen atoms are substituted with chemically reasonable groups such as alkyl, cycloalkyl, aryl, or aralkyl. When using pigment derivatives of formula (I) the invention for the treatment of pigments for use in waterborne coating systems, it is often desirable to use pigment derivatives in which pigment moiety Q is the same pigment type as the organic pigment being treated. However, it is possible and sometimes desirable to use pigment derivatives in which the pigment moiety Q is a different pigment type from the organic pigment being treated. Preferred pigment derivatives are those derived from quinacridones, particularly when used according to the invention to treat quinacridone pigments.

The term "$C_2-C_8$ alkylene" refers to difunctional aliphatic hydrocarbon groups having from 2 to 8 carbon atoms, including difunctional aliphatic hydrocarbon groups having one or more carbon-carbon double bonds. Suitable $C_2-C_8$ alkylene groups can be substituted with groups other than hydrogen, provided that such groups are chemically stable under the conditions used to prepare and use compounds of formula (I). Suitable substituents include $C_1-C_6$ alkyl or even other alkylene groups attached to the $C_2$–$C_8$ alkylene group in such a way that the Alk group is a cycloaliphatic group or contains a cycloaliphatic ring. Alk is preferably an unsubstituted and saturated $C_2$–$C_8$ alkylene (i.e., ethylene, propylene, butylene, pentylene, hexylene, heptylene, and octylene). Particularly preferred Alk groups are $C_2$–$C_4$ alkylene, especially propylene.

Preferred pigment derivatives according to the invention include di(hydroxyalkyl)aminoalkylsulfonamide-substituted quinacridones having formula (II)

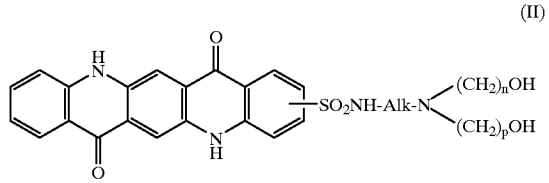

(II)

wherein Alk is $C_2$–$C_8$ alkylene (preferably $C_2$–$C_4$ alkylene, and more preferably propylene) and n and p are integers of from 2 to 6 (preferably 2 or 3, and more preferably 2). A particularly preferred quinacridone derivative according to the invention is quinacridone di(hydroxyethyl) aminopropylsulfonamide, which has the following formula (III)

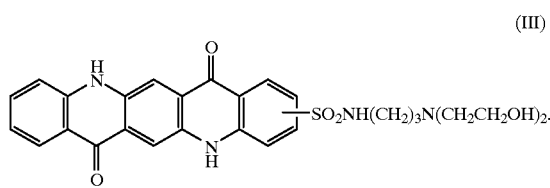

(III)

Pigment derivatives according to the invention can be prepared by methods known in the art. See, for example, U.S. Pat. Nos. 4,310,359 and 5,368,641. For the preferred sulfonamides, a preferred method involves chlorosulfonation of a pigment to form a pigment sulfonyl chloride that is then allowed to react with an appropriate di(hydroxyalkyl) amine to form the corresponding di(hydroxyalkyl) aminoalkylsulfonamide-substituted pigment derivative of formula (I). Carboxamides can be similarly prepared from an activated pigment carboxylic acid derivative, such as a carboxylic acid chloride, that is condensed with a di(hydroxyalkyl)amine to form the corresponding di(hydroxyalkyl)aminoalkylcarboxamide-substituted pigment derivative of formula (I). Other known synthesis methods can, of course, also be used.

Pigment derivatives according to the invention can be use to treat various organic pigments during chemical synthesis of the organic pigment or while carrying out conditioning or other surface treatment processes after the chemical synthesis steps have been completed.

Organic pigments that can be treated with the pigment derivatives according to the invention include quinacridones, phthalocyanines, perylenes (particularly the imides, diimides, anhydrides, and/or dianhydrides of perylene-3,4,9,10-tetracarboxylic acid), dioxazines (that is, triphenedioxazines), 1,4-diketopyrrolopyrroles, anthrapyrimidines, anthanthrones, flavanthrones, indanthrones, isoindolines, isoindolinones, perinones, pyranthrones, thioindigos, 4,4'-diamino-1,1'-dianthraquinonyl, or azo compounds, as well as substituted derivatives thereof. Mixtures, including solid solutions, of such pigments are also suitable.

Quinacridone pigments are particularly suitable organic pigments. Quinacridones (which, as used herein, includes unsubstituted quinacridone, quinacridone derivatives, and solid solutions thereof) can be prepared by any of several methods known in the art but are preferably prepared by thermally ring-closing various 2,5-dianilinoterephthalic acid precursors in the presence of polyphosphoric acid. E.g., W. Herbst and K. Hunger, *Industrial Organic Pigments,* 2nd ed. (New York: VCH Publishers, Inc., 1997), pages 454–461; S. S. Labana and L. L. Labana, "Quinacridones" in *Chemical Review,* 67, 1–18 (1967); and U.S. Pat. Nos. 3,157,659, 3,256,285, 3,257,405, and 3,317,539. Suitable quinacridone pigments can be unsubstituted or substituted (for example, with one or more alkyl, alkoxy, halogens such as chlorine, or other substituents typical of quinacridone pigments).

Metal phthalocyanine pigments are also suitable organic pigments. Although copper phthalocyanines are preferred, other metal-containing phthalocyanine pigments, such as those based on zinc, cobalt, iron, nickel, and other such metals, may also be used. Suitable phthalocyanine pigments can be unsubstituted or partially substituted (for example, with one or more alkyl, alkoxy, halogens such as chlorine, or other substituents typical of phthalocyanine pigments). Crude phthalocyanines can be prepared by any of several methods known in the art but are preferably prepared by a reaction of phthalic anhydride, phthalonitrile or derivatives thereof with a metal donor, a nitrogen donor (such as urea or the phthalonitrile itself), and an optional catalyst, preferably in an organic solvent. E.g., W. Herbst and K. Hunger, *Industrial Organic Pigments,* 2nd ed. (New York: VCH Publishers, Inc., 1997), pages 424–433; H. Zollinger, *Color Chemistry* (VCH Verlagsgessellschaft, 1991), pages 101–104; and N. M. Bigelow and M. A. Perkins, "Phthalocyanine Pigments" in *The Chemistry of Synthetic Dyes and Pigments,* ed. H. A. Lubs (Malabar, Fla.: Robert E. Krieger Publishing Company, 1955), pages 584–587; see also U.S. Pat. Nos. 4,158,572, 4,257,951, and 5,175,282 and British Patent 1,502,884.

Perylenes, particularly the diimides and dianhydrides of perylene-3,4,9,10-tetracarboxylic acid, are also suitable organic pigments. Suitable perylene pigments can be unsubstituted or substituted (for example, with one or more alkyl, alkoxy, halogens such as chlorine, or other substituents typical of perylene pigments), including those substituted at imide nitrogen atoms with chemically reasonable groups such as alkyl. Crude perylenes can be prepared by methods known in the art. E.g., W. Herbst and K. Hunger, *Industrial Organic Pigments,* 2nd ed. (New York: VCH Publishers, Inc., 1997), pages 9 and 476–479; H. Zollinger, *Color Chemistry* (VCH Verlagsgessellschaft, 1991), pages 227–228 and 297–298; and M. A. Perkins, "Pyridines and Pyridones" in *The Chemistry of Synthetic Dyes and Pigments,* ed. H. A. Lubs (Malabar, Fla.: Robert E. Krieger Publishing Company, 1955), pages 481–482.

Pigment compositions according to the invention can be prepared by treating an organic pigment with about 0.1 to about 20% by weight (preferably 1 to 10% by weight) of a pigment derivative of formula (I). Several methods for preparing such pigment compositions can be used.

In one preferred method, which is particularly useful for preparing quinacridone pigment compositions, a suitable pigment derivative of formula (I) (preferably a quinacridone derivative of formula (II)) is added during, or even before, synthesis of the organic pigment being treated in such a way that the reaction and the treatment processes can, at least in part, take place in situ as the organic pigment is formed. For example, when preparing quinacridone pigments, a preferred preparative method comprises (a) heating, at a temperature of about 80° C. to about 145° C. (preferably 100° C. to 130° C.), a reaction mixture comprising (i) 2,5-dianilinoterephthalic acid, 2,5-dianilino-6,13-dihydroterephthalic acid, 2,5-dianilino-3,6-dioxo-1,4-cyclohexadiene-1,4-dicarboxylic acid, or a derivative thereof having one or more substituents in at least one aniline ring; a salt or ester of said acid or derivative of such precursors; or a mixture thereof, (ii) about 0.1 to about 15 percent by weight (preferably 0.1 to 10 percent by weight), based on component (a)(i), of a suitable pigment derivative of the invention, (iii) about 3 to about 20 parts by weight (preferably 3 to 10 parts by weight), per part of component (a)(i), of a dehydrating agent (preferably polyphosphoric acid), with the proviso that if component (a)(i) is a 2,5-dianilino-6,13-dihydroterephthalic acid or derivative thereof, reaction step (a) additionally comprises an oxidation step (which converts the initially formed dihydroquinacridone intermediate to the corresponding quinacridone); (b) drowning the reaction mixture from step (a) by adding said reaction mixture to about 3 to about 15 parts by weight (preferably 5 to 10 parts by weight), per part of component (a)(i), of a liquid in which the quinacridone pigment is substantially insoluble; and (c) isolating the quinacridone pigment composition.

In a second preferred method, which can be carried out instead of or in conjunction with the method described above, a crude organic pigment and a suitable pigment derivative of formula (I) are dissolved ("pasted") or suspended ("swelled") in a strong mineral acid and then precipitated. A sufficient amount of mineral acid, preferably concentrated acid, is added to insure formation of an acidic solution or suspension within a reasonable amount of time. However, except for the requirement that the solution or suspension be acidic, the amount and concentration of acid is generally not critical. For example, more dilute acid may be used if the stirring time is extended, but use of the more concentrated acids is generally preferred for commercial applications. Suitable mineral acids include sulfuric acid and polyphosphoric acid, with sulfuric acid being preferred. It is particularly preferred to use at least 64% aqueous sulfuric acid in amounts of about 4 to about 15 parts by weight of acid relative to the total amount of the crude organic pigment and the pigment derivative. Although the dissolution rate of the mixture of crude pigment and pigment derivative in acid can be increased by warming the mixture (for example, to about 50° C.), it is generally preferable to dissolve the mixture in acid at or below 35° C. to minimize sulfonation (when using sulfuric acid) or degradation of the pigment or pigment derivative. After the acid treatment is completed, the pigment composition is precipitated by adding the strongly acidic solution to a liquid in which the pigment and pigment derivative are completely or almost completely insoluble, preferably water or methanol or other lower aliphatic alcohols (such as ethanol, propanol, or butanol), as well as mixtures thereof.

When using sulfuric acid or oleum in this manner to prepare pigment compositions according to the invention, the organic pigment moiety of each component can be sulfonated. If desired, compositions containing such sulfonated derivatives can be isolated, for example, as the free acid, as an ammonium salt, or as a metal salt (including, for example, alkali metal salts such as those of sodium or potassium, alkaline earth metal salts such as those of calcium or barium, and Group III metal salts such as those of aluminum).

Each of the above methods can be carried out in the presence of one or more additional pigment derivatives known in the art, particularly other sulfonic acid and sulfonamide derivatives.

Regardless of which of the above synthetic methods is used, the resultant pigment composition is collected by methods known in the art, preferably filtration followed by a washing step to remove residual acid. Other collection methods known in the art, such as centrifugation or even simple decantation, are suitable but generally less preferred. The pigment composition is then dried for use or for further manipulation before use.

The pigment composition thus obtained can be conditioned using any of various known methods, such as milling, solvent treatment, or a combination of such methods. Final particle size of the pigment can be controlled by varying the method of aftertreatment. For example, pigments can be made more transparent by reducing the particle size or more opaque by increasing the particle size. Suitable milling methods include dry-milling methods such as sand-milling, ball-milling, and the like, with or without additives, or wet-milling methods such as salt-kneading, bead-milling, and the like in water or various liquids, with or without additives. Solvent conditioning can be carried out by heating a dispersion of the pigment composition, often in the presence of additives, in a suitable liquid in which the organic pigment is substantially insoluble. Suitable liquids for either variant include organic solvents, such as alcohols (especially lower aliphatic alcohols), amides, esters, ketones and keto alcohols, ethers, and aliphatic and aromatic hydrocarbons; inorganic solvents, such as water; and mixtures thereof (preferably homogeneous mixtures, such as mixtures of water and water-miscible liquids such as methanol). Suitable additives include compositions that lessen or avoid flocculation, increase dispersion stability, and reduce coating viscosity, such as polymeric dispersants (or surfactants). E.g., U.S. Pat. Nos. 4,455,173, 4,758,665, 4,844,742, 4,895, 948, and 4,895,949. The temperature at which the pigments compositions are conditioned is generally not critical but is usually maintained between about 5° C. and about 200° C. (preferably below the boiling point of the liquid unless carried out under pressure, for example, in an autoclave).

In a third preferred method for preparing a pigment composition according to the invention, an unconditioned organic pigment can be conditioned in the presence of a pigment derivative of formula (I). When using wet milling or solvent conditioning, the liquid medium is preferably one in which the pigment derivative of formula (I) is at least partly insoluble. The pigment derivative of the invention can be incorporated by this method alone or can be used in conjunction with one or more of the preparative methods described above as long as the total amount of the pigment derivative relative to the organic pigment is kept within the range of about 0.1 to about 20% by weight. It is also possible to include one or more other known pigment derivatives, particularly other sulfonic acid and sulfonamide derivatives.

Although the particular method of treating an organic pigment with a pigment derivative of formula (I) is often not critical, it has been found that physically mixing the pigment derivative with the organic pigment does not provide the level of improvement in performance attainable by the methods described above. Physically blending a pigment derivative with a pigment composition prepared by other methods would not, in any event, be detrimental.

During or after the optional conditioning step, it is often desirable to use various other optional ingredients that provide improved properties. Examples of such optional ingredients include fatty acids having at least 12carbon atoms, such as stearic acid or behenic acid, or corresponding amides, esters, or salts, such as magnesium stearate, zinc stearate, aluminum stearate, or magnesium behenate; quaternary ammonium compounds, such as tri[($C_1$–$C_4$ alkyl) benzyl]ammonium salts; plasticizers, such as epoxidized soya bean oil; waxes, such as polyethylene wax; resin acids, such as abietic acid, rosin soap, hydrogenated or dimerized rosin; $C_{12}$–$C_{18}$-paraffin-disulfonic acids; alkylphenols; alcohols, such as stearyl alcohol; amines, such as laurylamine or stearylamine; and aliphatic 1,2-diols, such as dodecane-1,2-diol. Such additives can be incorporated in amounts ranging from about 0.05 to 20% by weight (preferably 1 to 10% by weight), based on the amount of pigment.

Pigment compositions prepared according to the invention are particularly suitable for use in waterborne coating systems. However, it is also possible to use such pigment compositions in other coating applications, such as physically or oxidatively drying lacquers, stoving enamels, reactive paints, two-component paints, solvent-based paints, emulsion paints for weatherproof coatings, and distempers. Furthermore, such pigment compositions exhibit light stability and migration properties that make them suitable for many other pigment applications. Examples include pigmented mixtures with other materials, pigment formulations, printing ink, colored paper, or colored macromolecular materials. The term "mixtures with other materials" is understood to include, for example, mixtures with inorganic white pigments, such as titanium dioxide or cement, or other inorganic pigments. Examples of pigment formulations include flushed pastes with organic liquids or pastes and dispersions with water, dispersants, and, where appropriate, preservatives. Printing inks include those known for use in paper, textile, and tinplate printing. Suitable macromolecular substances include those of a natural origin, such as rubber; those obtained by chemical modification, such as acetyl cellulose, cellulose butyrate, or viscose; or those produced synthetically, such as polymers, polyaddition products, and polycondensates. Examples of synthetic macromolecular substances include plastic materials, such as polyvinyl chloride, polyvinyl acetate, and polyvinyl propionate; polyolefins, such as polyethylene and polypropylene; high molecular weight polyamides; polymers and copolymers of acrylates, methacrylates, acrylonitrile, acrylamide, butadiene, or styrene; polyurethanes; and polycarbonates. Materials pigmented with such pigment compositions can have any desired shape or form.

The pigment compositions prepared according to this invention are highly water-resistant, oil-resistant, acid-resistant, lime-resistant, alkali-resistant, solvent-resistant, fast to over-lacquering, fast to over-spraying, fast to sublimation, heat-resistant, and resistant to vulcanizing, yet give a very good tinctorial yield and are readily dispersible.

The following examples further illustrate details for the preparation and use of the compounds of this invention. The invention, which is set forth in the foregoing disclosure, is not to be limited either in spirit or scope by these examples. Those skilled in the art will readily understand that known variations of the conditions and processes of the following preparative procedures can be used to prepare these compounds. Unless otherwise noted, all temperatures are degrees Celsius and all percentages are percentages by weight.

EXAMPLES

Unless otherwise noted, water-based paints tests were carried out using a waterborne basecoat/solvent-borne clearcoat paint system. Aqueous dispersions were prepared using a mixture of 12.4% AROLON® 559-G4-70 acrylic resin (Reichhold Chemicals, Inc.), 3.2% SOLSPERSE® 27000 hyperdispersant (Zeneca, Inc.), 1.6% 2-amino-2-methyl-1-propanol (Angus Chemical), and 18% pigment, which gave a pigment-to-binder ratio of 18:12 and a total solids content of 30%. The pigment-to-binder ratio was then reduced to 10:40 with additional AROLON® 559-G4-70 acrylic resin (total amount 26%) and 25% CYMEL® 325 melamine/formaldehyde resin (Cytec Industries), which gave a total solids content of 50%. Masstone and transparency measurements were made using films applied at 76 μm and 38 μm wet film thickness, respectively, and allowed to stand at room temperature for fifteen minutes and at 100° C. for five minutes. Clearcoats containing a mixture of 80% of AROPLAZ® 1453-X-50 alkyd resin (Reichhold Chemicals, Inc.) and 20% CYMEL® 325 melamine/formaldehyde resin at a total solids level of 57% were then applied over the basecoat at a 76 μm wet film thickness allowed to stand at room temperature for fifteen minutes and at 121° C. for fifteen minutes.

Undertone tint paints were prepared from the reduced aqueous dispersions described above having a pigment-to-binder ratio of 10:40 by adding additional AROLON® 559-G4-70 acrylic resin, CYMEL® 325 melamine/formaldehyde resin, and 35% TINT-AYD® CW-5003 white dispersion (Daniel Products Company), which gave a pigment-to-binder ratio of 1:1.1, a total solids content of 55%, and a $TiO_2$-to-pigment ratio of 90:10. Color measurements were made using films applied at 38 μm wet film thickness and allowed to stand at room temperature for fifteen minutes and at 100° C. for five minutes. Clearcoats were then applied and baked as described above.

Metallic paints were prepared from the dispersion described above having a pigment-to-binder ratio of 18:12 using a water-dispersible aluminum pigment (available as HYDRO PASTE® 8726 from Silberline Manufacturing Co., Inc.), AROLON® 559-G4-70 acrylic resin, and CYMEL® 325 melamine/formaldehyde resin in quantities that provided a pigment-to-binder ratio of 1:2, an aluminum-to-pigment ratio of 20:80, and a total solids content of 43%. Color measurements were made using films applied at 38 μm wet film thickness and baked as described above. Clearcoats were then applied and baked as described above.

Rheological Determinations

Viscosities of pigment concentrates prepared according to the examples in water-based paint systems by the Brookfield method. Viscosities were rated according to the following scale, where higher values indicate better rheological properties:

| | |
|---|---|
| Thin liquid | 5 |
| Liquid | 4 |
| Thick liquid | 3 |
| Sluggish | 2 |
| Very sluggish | 1 |

Preparation of Quinacridone Di(hydroxyethyl) aminopropylsulfonamide

To a mixture of 187.5 g (1.61 mol) of chlorosulfonic acid and 37.5 g (0.315 mol) of thionyl chloride at a temperature of 10° C. was added 37.5 g (0.108 mol) of crude quinacridone over a period of 30 minutes while maintaining a temperature below 20° C. The reaction was allowed to warm to 30–31° C. and then maintained at that temperature for four hours. The resultant quinacridone sulfonyl chloride was added to ice/water while maintaining a temperature below 5° C. by addition of ice. The resultant slurry was filtered and the solid component was washed with cold water (below 5° C.). The wet presscake was used immediately for the amidation reaction.

To a solution of 76.3 g (0.72 mol) of sodium carbonate in 600 g of water at 5° C. were sequentially added 87.6 g (0.54 mol) of N,N-diethanolaminopropylamine and the quinacridone sulfonyl chloride presscake. The resultant slurry was stirred as the temperature was allowed to warm to 25° C. and then maintained at 25° C. for twelve hours. The slurry was heated to 60° C. for one hour and the solid component was collected by filtration and washed with water. The presscake was dried in an oven at 60° C. to give 42.4 g of quinacridone di(hydroxyethyl)aminopropylsulfonamide.

Examples 1–2

Examples 1 and 2 describe the treatment of 2,9-dimethylquinacridone with a pigment derivative of the invention and two different dispersants.

Example 1

Crude 2,9-dimethylquinacridone presscake (111 g, corresponding to 30.0 g of 100% strength pigment) was reslurried in 367 g of water and the pH was adjusted to 9.0. The slurry was heated at 140–145° C. for two hours in a laboratory Parr reactor. After the slurry was allowed to cool to room temperature, a slurry of quinacridone di(hydroxyethyl) aminopropylsulfonamide (prepared from a quantity of presscake corresponding to 4.6 g of the pigment derivative) was added and stirred at 45° C. for one hour. A solution of Bykumen WS dispersant (corresponding to 3 g of active dispersant; BYK-Chemie USA, Wallingford, Conn.) was added and the mixture was stirred for one hour at 45° C. An aqueous emulsion of 1.4 g of an anionic sulfosuccinate surfactant and 17.0 g of a petroleum distillate was added and the mixture was stirred at 45° C. for three hours. The solid component of the resultant slurry was collected by filtration and washed with water. The wet presscake was dried in an oven at 60° C. overnight to yield 34.6 g of a magenta (i.e., red-violet) pigment.

A water-based paint prepared as described above had a rheology rating of 2–3.

Example 2

Crude 2,9-dimethylquinacridone presscake (111 g, corresponding to 30.0 g of 100% strength pigment) was reslurried in 367 g of water and the pH was adjusted to 9.0. The slurry was heated at 140–145° C. for two hours in a laboratory Parr reactor. After the slurry was allowed to cool to room temperature, a slurry of quinacridone di(hydroxyethyl) aminopropylsulfonamide (prepared from a quantity of presscake corresponding to 3.2 g of the pigment derivative) was added and stirred at 45° C. for one hour. A solution of Lactimon WS dispersant (corresponding to 3 g of active dispersant; BYK-Chemie USA) was added and the mixture was stirred for one hour at 45° C. After the pH of the slurry was adjusted to 4.3, an aqueous emulsion of 1.4 g of an anionic sulfosuccinate surfactant and 17.0 g of a petroleum distillate was added and the mixture was stirred at 45° C. for three hours. The solid component of the resultant slurry was collected by filtration and washed with water. The wet presscake was dried in an oven at 60° C. overnight to yield 34.6 g of a magenta pigment.

A water-based paint prepared as described above had a rheology rating of 3–4.

Example 3–8

Examples 4, 6, and 7 of the invention describe different methods for the treatment of 2,9-dimethylquinacridone pigment with a pigment derivative of the invention. Comparison Example 3 describes the preparation of the 2,9-dimethylquinacridone without using a pigment derivative of the invention. Comparison Example 5 describes the preparation of the 2,9-dimethylquinacridone using a pigment derivative that is not within the scope of the invention. Example 6 describes the preparation of a physical mixture of 2,9-dimethylquinacridone with a pigment derivative of the invention.

Example 3

Comparison 2,9-Dimethylquinacridone was prepared by ring closure in the absence of a pigment derivative of the invention.

To 300 g of polyphosphoric acid (112%) at 82° C. was added 68.2 g of 2,5-di(4-methylanilino)terephthalic acid over a period of 50 minutes. The reaction mixture was held at 123–125° C. for two hours. After being cooled to 93° C., the reaction mixture was slowly poured into methanol (494 g) while maintaining the temperature below reflux by external cooling. After being heated at reflux for one hour, the methanol slurry was diluted with water and the solid component was collected by filtration and washed. The wet filtercake was reslurried in water and the pH of the slurry was adjusted to 7–8 with dilute NaOH. The slurry was then treated with 59 g of 50% NaOH and heated at 90° C. for one hour. After the slurry was cooled to 65° C., the solid component was collected by filtration and washed. The wet filtercake was reslurried in water (total of 896 g) and the pH was adjusted to 9.7. The slurry was then heated at 140–145° C. for two hours. After being cooled to room temperature, the pH of the slurry was adjusted to 3.2. An aqueous emulsion of 2.0 g of an anionic sulfosuccinate surfactant and 26.8 g of a petroleum distillate was added and the mixture was stirred at 45° C. for three hours. The solid component of the slurry was collected by filtration and washed with water. The wet presscake was dried in an oven at 60° C. overnight to yield 63 g of a magenta pigment.

A water-based paint prepared as described above had a rheology rating of 2.

Example 4

2,9-Dimethylquinacridone was prepared by ring closure in the presence of a pigment additive of the invention.

To 300 g of polyphosphoric acid (112%) at 82° C. was added 6.8 g of quinacridone di(hydroxyethyl) aminopropylsulfonamide. After the mixture was stirred for five minutes, 68.2 g of 2,5-di(4-methylanilino)terephthalic acid was added over a period of 40 minutes. The reaction mixture was held at 123–127° C. for two hours. After being cooled to 93° C., the reaction mixture was slowly poured into methanol (494 g) while maintaining the temperature below reflux by external cooling. After being heated at reflux for one hour, the methanol slurry was diluted with water and the solid component was collected by filtration and washed. The wet filtercake was reslurried in water and the pH of the slurry was adjusted to 7–8 with dilute NaOH. The slurry was then treated with 5.5 g of 50% NaOH and heated at 90° C.

for one hour. After the slurry was cooled to 65° C., the solid component was collected by filtration and washed. The wet filtercake was reslurried in water (total of 968 g) and the pH was adjusted to 9.6. The slurry was then heated at 140–145° C. for two hours. After being cooled to room temperature, the pH of the slurry was adjusted to 3.2. An aqueous emulsion of 2.4 g of an anionic sulfosuccinate surfactant and 32.3 g of a petroleum distillate was added and the mixture was stirred at 45° C. for three hours. The solid component of the slurry was collected by filtration and washed with water. The wet presscake was dried in an oven at 60° C. overnight to yield 63 g of a magenta pigment.

A water-based paint prepared as described above exhibited a much deeper, brighter, and more transparent masstone, a stronger, bluer tint, and a much brighter, much bluer, and stronger metallic than a paint prepared using the pigment of comparison Example 3.

Example 5

Comparison 2,9-Dimethylquinacridone prepared according to comparison Example 3 was dry blended with a pigment derivative not according to the invention.

2,9-Dimethylquinacridone prepared according to comparison Example 3 was dry blended with 10% quinacridone diethylaminopropylsulfonamide, which was prepared by the method described above for quinacridone di(hydroxyethyl) aminopropylsulfonamide except for using N,N-diethylaminopropylamine instead of N,N-diethanolaminopropylamine.

Example 6

2,9-Dimethylquinacridone prepared according to comparison Example 3 was dry blended with a pigment derivative of the invention.

2,9-Dimethylquinacridone prepared according to comparison Example 3 was dry blended with 10% quinacridone di(hydroxyethyl)aminopropylsulfonamide. A water-based paint prepared as described above exhibited poorer rheological properties and slightly deeper and brighter masstone and slightly bluer tint and metallic compared to a paint prepared using the pigment of comparison Example 3 and exhibited slightly better rheological properties and slightly bluer metallic compared to a paint prepared using the pigment of comparison Example 5.

Example 7

Freshly prepared crude 2,9-dimethylquinacridone was treated with a pigment derivative of the invention under autoclaving conditions.

To 300 g of polyphosphoric acid (112%) at 82° C. was added 68.2 g of 2,5-di(4-methylanilino)terephthalic acid over a period of 50 minutes. The reaction mixture was held at 123–125° C. for two hours. After being cooled to 93° C., the reaction mixture was slowly poured into methanol (494 g) while maintaining the temperature below reflux by external cooling. After being heated at reflux for one hour, the methanol slurry was diluted with water and the solid component was collected by filtration and washed. The wet filtercake was reslurried in water and the pH of the slurry was adjusted to 7–8 with dilute NaOH. The slurry was then treated with 59 g of 50% NaOH and heated at 90° C. for one hour. After the slurry was cooled to 65° C., the solid component was collected by filtration and washed. The wet 2,9-dimethylquinacridone filtercake was reslurried in water with 13.7 g of quinacridone di(hydroxyethyl) aminopropylsulfonamide (corresponding to 2.7 g of the pigment derivative) and the pH was adjusted to 9.6. The slurry was then heated at 140–145° C. for two hours. After being cooled to room temperature, the pH of the slurry was adjusted to 3.2. An aqueous emulsion of 2.1 g of an anionic sulfosuccinate surfactant and 28.5 g of a petroleum distillate was added and the mixture was stirred at 45° C. for three hours. The solid component of the slurry was collected by filtration, washed, and dried to yield 67 g of a magenta pigment.

A water-based paint prepared as described above exhibited a deeper, brighter, more transparent masstone and a brighter metallic than a paint prepared using the pigment of comparison Example 3.

Example 8

2,9-Dimethylquinacridone was prepared by ring closure in the presence of a pigment additive of the invention and treatment with a dispersant.

To 300 g of polyphosphoric acid (112%) at 82° C. was added 6.8 g of quinacridone di(hydroxyethyl) aminopropylsulfonamide. After the mixture was stirred for five minutes, 68.2 g of 2,5-di(4-methylanilino)terephthalic acid was added over a period of 40 minutes. The reaction mixture was held at 123–127° C. for two hours. After being cooled to 93° C., the reaction mixture was slowly poured into methanol (494 g) while maintaining the temperature below reflux by external cooling. After being heated at reflux for one hour, the methanol slurry was diluted with water and the solid component was collected by filtration and washed. The wet filtercake was reslurried in water and the pH of the slurry was adjusted to 7–8 with dilute NaOH. The slurry was treated with 5.5 g of 50% NaOH and heated at 90° C. for one hour. After the slurry was cooled to 65° C., the solid component was collected by filtration and washed. The wet filtercake was reslurried in water (total of 968 g) and the pH was adjusted to 9.6. The slurry was then heated at 140–145° C. for two hours. After being cooled to room temperature, the pH of the slurry was adjusted to 4.5. A solution of Lactimon WS dispersant (corresponding to 3.4 g of active dispersant; BYK-Chemie USA) was added and the mixture was stirred for one hour at 40–45° C. After the pH of the slurry was adjusted to 3.5, an aqueous emulsion of 2.4 g of an anionic sulfosuccinate surfactant and 32.3 g of a petroleum distillate was added and the mixture was stirred at 45° C. for three hours. The solid component of the slurry was collected by filtration and washed with water. The wet presscake was dried in an oven at 60° C. overnight to yield 63 g of a magenta pigment.

A water-based paint prepared as described above exhibited an extremely deep, bright, and transparent masstone, a bluer tint, and a brighter, bluer, and stronger metallic than a paint prepared using the pigment of comparison Example 3.

Examples 9–11

Examples 10 and 11 of the invention describe the treatment of quinacridone pigment with different amounts of a pigment derivative of the invention. Comparison Example 9 describes the preparation of the pigment without using a pigment derivative of the invention.

Example 9

Comparison

Quinacridone was prepared according to the invention by ring closure in the absence of a pigment derivative of the invention.

To 300 g of polyphosphoric acid (117%) at 85° C. was added 68.2 g of 2,5-dianilinoterephthalic acid over a period of 45 minutes. The reaction mixture was held at 123–125° C. for two hours. After being cooled to 92° C., the reaction mixture was slowly poured into methanol (453 g) while maintaining the temperature below reflux by external cooling. After being heated at reflux for one hour, the methanol slurry was diluted with water and the solid component was collected by filtration and washed. The wet filtercake was reslurried in water and the pH of the slurry was adjusted to 7–8 with dilute NaOH. The slurry was treated with 7.5 g of 50% NaOH and heated at 90° C. for one hour. After the slurry was cooled to 65° C., the solid component was collected by filtration and washed. The wet filtercake was reslurried in water and the pH was adjusted to 9.7. A solution of 3.3 g of a cycloaliphatic carboxylic acid dissolved in approximately 40 mL of alkaline water was added to the slurry and the mixture was heated at 140–145° C. for two hours. After being cooled to room temperature, the slurry was adjusted to pH 4.5–5.0 and held at 70° C. for one hour. The solid component was collected by filtration, washed, and dried to yield 56 g of a violet pigment.

Example 10

Quinacridone was prepared by ring closure in the presence of 10% by weight, relative to the quinacridone, of a pigment additive of the invention.

Quinacridone was prepared by the method of Example 9 except that 6.8 g of quinacridone di(hydroxyethyl)aminopropylsulfonamide was added to the polyphosphoric acid just before addition of the 2,5-dianilinoterephthalic acid. Quinacridone (58.8 g) was obtained as a violet pigment.

A water-based paint prepared as described above exhibited a much deeper, brighter, and more transparent masstone, a cleaner tint, and a brighter, bluer, and stronger metallic and had better rheological properties than a paint prepared using the pigment of comparison Example 9.

Example 11

Quinacridone was prepared by ring closure in the presence of 1% by weight, relative to the quinacridone, of a pigment additive of the invention.

Quinacridone was prepared by the method of Example 9 except that 0.7 g of quinacridone di(hydroxyethyl)aminopropylsulfonamide was added to the polyphosphoric acid just before addition of the 2,5-dianilinoterephthalic acid. Quinacridone (48.3 g) was obtained as a violet pigment.

A water-based paint prepared as described above exhibited a deeper and more transparent masstone, a weaker but cleaner tint, and a weaker and less bright metallic than a paint prepared using the pigment of comparison Example 9 and had essentially the same rheological properties.

What is claimed is:

1. A pigment derivative having the formula

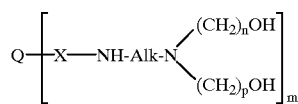

wherein

Q represents a quinacridone moiety;

X is -SO$_2$- or -CO-; Alk is C$_2$–C$_8$ alkylene or substituted C$_2$–C$_8$ alkylene;

m is an integer of from 1 to 4; and n and p are independently integers of from 2 to 6.

2. A pigment derivative according to claim 1 having the formula

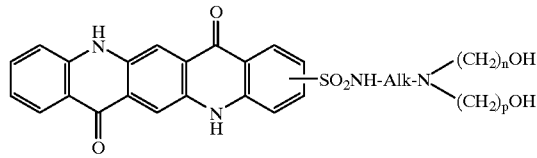

wherein Alk is C$_2$–C$_8$ alkylene and n and p are integers of from 2 to 6.

3. A pigment derivative according to claim 1 having the formula

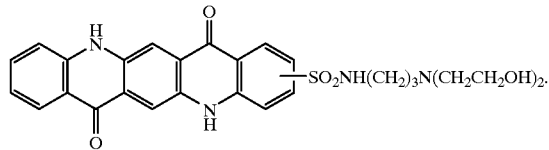

4. A pigment composition comprising an organic pigment treated with about 0.1 to about 20% by weight, based on the organic pigment, of a pigment derivative having the formula

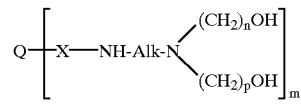

wherein

Q represents a quinacridone moiety;

X is -SO$_2$- or -CO-;

Alk is C$_2$–C$_8$ alkylene or substituted C$_2$–C$_8$ alkylene;

m is an integer of from 1 to 4; and n and p are independently integers of from 2 to 6.

5. A pigment composition according to claim 4 wherein the organic pigment is treated with 1 to 10% by weight of the pigment derivative.

6. A pigment composition according to claim 4 wherein the pigment derivative is a compound having the formula

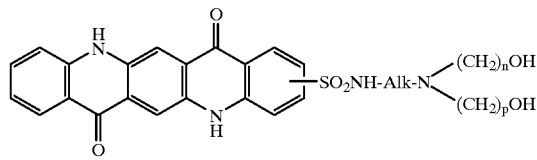

wherein Alk is C$_2$–C$_8$ alkylene and n and p are integers of from 2 to 6.

7. A pigment composition according to claim 4 wherein the pigment derivative is a compound having the formula

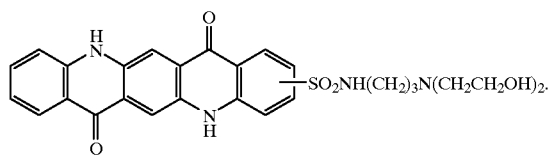

8. A pigment composition according to claim 5 wherein the organic pigment is treated with the pigment derivative by
   (a) adding the pigment derivative during synthesis of the organic pigment, or
   (b) mixing the organic pigment with the pigment derivative in a mineral acid and then precipitating the resultant acidic mixture, or
   (c) conditioning the organic pigment in the presence of the pigment derivative, or
   (d) a combination of one or more of methods (a), (b), and (c).

9. A pigment composition according to claim 4 wherein the organic pigment is a quinacridone pigment.

10. A pigmented coating composition containing as pigment a pigment composition comprising an organic pigment treated with about 0.1 to about 20% by weight, based on the organic pigment, of a pigment derivative having the formula

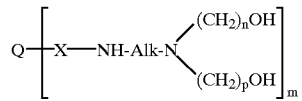

wherein

Q represents a quinacridone moiety;

X is -$SO_2$- or -CO-;

Alk is $C_2$–$C_8$ alkylene or substituted $C_2$–$C_8$ alkylene;

m is an integer of from 1 to 4; and n and p are independently integers of from 2 to 6.

11. A pigmented coating composition according to claim 10 wherein the organic pigment is a quinacridone pigment.

* * * * *